US008676135B2

(12) United States Patent
Hong et al.

(10) Patent No.: US 8,676,135 B2
(45) Date of Patent: Mar. 18, 2014

(54) IN-VEHICLE MOBILE MUSIC PURCHASE (75) Inventors: Leon Hong, Sammamish, WA (US);
Kamyar Moinzadeh, Bellevue, WA (US); David Quimby, Seattle, WA (US); Darrin Garrett, Kingston, WA (US)

(73) Assignee: Airbiquity Inc., Seattle, WA (US)

( * ) Notice: Subject to any disclaimer, the term of this patent is extended or adjusted under 35 U.S.C. 154(b) by 828 days.

(21) Appl. No.: 12/607,904

(22) Filed: Oct. 28, 2009

(65) Prior Publication Data
US 2010/0049626 A1 Feb. 25, 2010

Related U.S. Application Data (63) Continuation-in-part of application No. 12/043,933, filed on Mar. 6, 2008, now Pat. No. 8,391,775.

(60) Provisional application No. 61/109,077, filed on Oct. 28, 2008, provisional application No. 61/109,277, filed on Oct. 29, 2008, provisional application No. 60/894,160, filed on Mar. 9, 2007.

(51) Int. Cl.
*H04B 1/034* (2006.01)
*H04B 1/06* (2006.01)
*H04B 7/00* (2006.01)

(52) U.S. Cl.
USPC .......................... 455/99; 455/345; 455/41.2

(58) Field of Classification Search
USPC ............ 455/569.2, 575.9, 95, 96, 97, 98, 99, 455/152.1, 297, 344, 345, 41.2, 41.3; 707/899; 725/61
See application file for complete search history.

(56) References Cited

U.S. PATENT DOCUMENTS

| 5,898,910 | A | 4/1999 | Miyake |
| 6,105,063 | A | 8/2000 | Hayes, Jr. |
| 6,148,253 | A | 11/2000 | Taguchi |
| 6,175,789 | B1 | 1/2001 | Beckert |

(Continued)

FOREIGN PATENT DOCUMENTS

| CA | 2242494 | 9/1997 |
| DE | 102 26 425 A1 | 12/2003 |

(Continued)

OTHER PUBLICATIONS

European Patent Office; International Search Report and Written Opinion of the Searching Authority for PCT/US2009/062431; Jan. 25, 2010.

(Continued)

*Primary Examiner* — Eugene Yun
(74) *Attorney, Agent, or Firm* — Stolowitz Ford Cowger LLP (57) ABSTRACT

Methods and apparatus are disclosed for improvements in vehicle entertainment systems. A user (vehicle passenger) may wish to buy a song (or other media item) that is currently playing on the vehicle digital radio. In one embodiment, the user may direct a purchase command directly to a music vendor, without going through a central server. In the example of purchasing digital music files, such vendors currently may include iTunes, Amazon.com, Rhapsody and others. The purchase command may be entered at the user's mobile phone user interface. In another embodiment, the purchase request may be entered to the vehicle control system without the use of a mobile phone. The requested media item is downloaded to the vehicle and or to a designated alternative destination which may be the user's home or office or mobile device.

22 Claims, 5 Drawing Sheets

(56) References Cited

U.S. PATENT DOCUMENTS

| | | |
|---|---|---|
| 6,252,364 B1 | 6/2001 | Chiang |
| 6,356,812 B1 | 3/2002 | Cragun |
| 6,434,450 B1 | 8/2002 | Griffin, Jr. |
| 6,481,628 B2 | 11/2002 | Liou |
| 6,487,717 B1 | 11/2002 | Brunemann |
| 6,553,375 B1 | 4/2003 | Huang |
| 6,578,047 B1 | 6/2003 | Deguchi |
| 6,623,136 B1 | 9/2003 | Kuo |
| 6,650,534 B2 | 11/2003 | Tree |
| 6,799,201 B1 | 9/2004 | Lee |
| 6,812,942 B2 | 11/2004 | Ribak |
| 6,845,360 B2 | 1/2005 | Jensen |
| 6,853,910 B1 | 2/2005 | Oesterling |
| 6,895,316 B2 | 5/2005 | Chen |
| 6,915,176 B2 | 7/2005 | Novelli |
| 6,961,536 B2 | 11/2005 | Himmel |
| 6,973,476 B1 | 12/2005 | Naden |
| 7,053,866 B1 | 5/2006 | Mimran |
| 7,062,528 B2 | 6/2006 | Deguchi |
| 7,107,234 B2 | 9/2006 | Deguchi |
| 7,127,454 B2 | 10/2006 | Deguchi |
| 7,139,660 B2 | 11/2006 | Sarkar |
| 7,158,943 B2 | 1/2007 | van der Riet |
| 7,190,798 B2 | 3/2007 | Yasuhara |
| 7,190,971 B1 | 3/2007 | Kawamoto |
| 7,218,925 B2 | 5/2007 | Crocker |
| 7,251,473 B2 | 7/2007 | Alrabady |
| 7,302,243 B2 | 11/2007 | Tarbouriech |
| 7,327,228 B2 | 2/2008 | Min |
| 7,334,041 B2 | 2/2008 | Swindells |
| 7,346,435 B2 | 3/2008 | Amendola |
| 7,362,239 B2 | 4/2008 | Franczyk |
| 7,363,357 B2 | 4/2008 | Parupudi |
| 7,366,892 B2 | 4/2008 | Spaur |
| 7,379,541 B2 | 5/2008 | Iggulden |
| 7,398,055 B2 | 7/2008 | Tajima |
| 7,437,183 B2 | 10/2008 | Makinen |
| 7,461,122 B2 | 12/2008 | Kawana |
| 7,467,028 B2 | 12/2008 | Pilgrim |
| 7,480,512 B2 | 1/2009 | Graham |
| 7,505,732 B2 | 3/2009 | McDonough |
| 7,552,009 B2 | 6/2009 | Nelson |
| 7,613,564 B2 | 11/2009 | Vorona |
| 7,623,949 B2 | 11/2009 | Nou |
| 7,634,095 B2 | 12/2009 | Arun |
| 7,643,788 B2 | 1/2010 | Habaguchi |
| 7,643,913 B2 | 1/2010 | Taki |
| 7,657,368 B2 | 2/2010 | Weiss |
| 7,676,830 B2 | 3/2010 | Kuz |
| 7,684,908 B1 | 3/2010 | Ogilvie |
| 7,693,612 B2 | 4/2010 | Bauchot |
| 7,805,542 B2 | 9/2010 | Hindman |
| 7,812,712 B2 | 10/2010 | White |
| 7,815,100 B2 | 10/2010 | Adams |
| 7,826,945 B2 | 11/2010 | Zhang |
| 7,908,172 B2 | 3/2011 | Corts et al. |
| 7,917,644 B2 | 3/2011 | Vedantham |
| 7,970,436 B1 | 6/2011 | Katzer |
| 8,014,915 B2 | 9/2011 | Jeon |
| 8,117,246 B2 * | 2/2012 | Sadovsky et al. ............ 707/899 |
| 8,296,195 B2 | 10/2012 | Harb |
| 8,310,985 B2 | 11/2012 | Harb |
| 8,391,155 B2 | 3/2013 | Harb |
| 8,462,645 B1 | 6/2013 | Harb |
| 2001/0055391 A1 | 12/2001 | Jacobs |
| 2002/0049037 A1 | 4/2002 | Christensen |
| 2002/0082901 A1 | 6/2002 | Dunning |
| 2002/0087655 A1 | 7/2002 | Bridgman |
| 2002/0091848 A1 | 7/2002 | Agresta |
| 2003/0003892 A1 | 1/2003 | Makinen |
| 2003/0088619 A1 | 5/2003 | Boundy |
| 2003/0097338 A1 | 5/2003 | Mankovich |
| 2003/0147534 A1 | 8/2003 | Ablay |
| 2003/0195925 A1 | 10/2003 | Kaneko |
| 2004/0002938 A1 | 1/2004 | Deguchi |
| 2004/0034560 A1 | 2/2004 | Mathis |
| 2004/0209614 A1 | 10/2004 | Bright et al. |
| 2004/0210943 A1 | 10/2004 | Philyaw |
| 2004/0214525 A1 | 10/2004 | Ahn |
| 2004/0259545 A1 | 12/2004 | Morita |
| 2005/0031100 A1 | 2/2005 | Iggulden |
| 2005/0060350 A1 | 3/2005 | Baum |
| 2005/0085965 A1 | 4/2005 | Issa |
| 2005/0132024 A1 | 6/2005 | Habaguchi |
| 2005/0154599 A1 | 7/2005 | Kopra |
| 2005/0216553 A1 | 9/2005 | Mallonee |
| 2005/0216855 A1 | 9/2005 | Kopra |
| 2005/0216902 A1 | 9/2005 | Schaefer |
| 2005/0221878 A1 | 10/2005 | Van Bosch |
| 2005/0278080 A1 | 12/2005 | Pilgrim |
| 2005/0283284 A1 | 12/2005 | Grenier |
| 2006/0015221 A1 | 1/2006 | Sarkar |
| 2006/0025897 A1 | 2/2006 | Shostak |
| 2006/0025907 A9 | 2/2006 | Kapolka |
| 2006/0036356 A1 | 2/2006 | Rasin |
| 2006/0041337 A1 | 2/2006 | Augsburger |
| 2006/0074808 A1 | 4/2006 | Boesen |
| 2006/0141962 A1 | 6/2006 | Forbes |
| 2006/0143016 A1 | 6/2006 | Jones |
| 2006/0161312 A1 | 7/2006 | Juengling |
| 2006/0253874 A1 | 11/2006 | Stark |
| 2006/0265731 A1 | 11/2006 | Matsuda |
| 2007/0005206 A1 | 1/2007 | Zhang |
| 2007/0021885 A1 | 1/2007 | Soehren |
| 2007/0043829 A1 | 2/2007 | Dua |
| 2007/0061215 A1 | 3/2007 | Waites |
| 2007/0100513 A1 | 5/2007 | Asano |
| 2007/0100766 A1 | 5/2007 | Healy |
| 2007/0126604 A1 | 6/2007 | Thacher |
| 2007/0142055 A1 | 6/2007 | Toivanen |
| 2007/0143788 A1 | 6/2007 | Abernethy, Jr. et al. |
| 2007/0143798 A1 | 6/2007 | Jira |
| 2007/0149114 A1 | 6/2007 | Danilenko |
| 2007/0200663 A1 | 8/2007 | White |
| 2007/0208464 A1 | 9/2007 | Moorhead |
| 2007/0232223 A1 | 10/2007 | Bilange |
| 2007/0239895 A1 | 10/2007 | Alperin |
| 2007/0244750 A1 | 10/2007 | Grannan |
| 2007/0265744 A1 | 11/2007 | Nicolai |
| 2007/0265745 A1 | 11/2007 | Styles |
| 2007/0265979 A1 | 11/2007 | Hangartner |
| 2007/0272423 A1 | 11/2007 | Cutler |
| 2007/0281606 A1 | 12/2007 | Baunach |
| 2007/0294096 A1 | 12/2007 | Randall |
| 2008/0005733 A1 | 1/2008 | Ramachandran |
| 2008/0007120 A1 | 1/2008 | Weyl |
| 2008/0071882 A1 | 3/2008 | Hering |
| 2008/0114480 A1 | 5/2008 | Harb |
| 2008/0114664 A1 | 5/2008 | Harb |
| 2008/0143497 A1 | 6/2008 | Wasson et al. |
| 2008/0147487 A1 | 6/2008 | Hirshberg |
| 2008/0172147 A1 | 7/2008 | Taki |
| 2008/0214236 A1 | 9/2008 | Harb |
| 2008/0248742 A1 | 10/2008 | Bauer |
| 2008/0249886 A1 | 10/2008 | Woodard |
| 2008/0266051 A1 | 10/2008 | Taki |
| 2008/0268810 A1 | 10/2008 | Kobayashi |
| 2008/0269961 A1 | 10/2008 | Shitanaka |
| 2008/0318529 A1 | 12/2008 | Harb |
| 2009/0075624 A1 | 3/2009 | Cox |
| 2009/0079555 A1 | 3/2009 | Aguirre De Carcer |
| 2009/0119657 A1 | 5/2009 | Link, II |
| 2009/0128286 A1 | 5/2009 | Vitito |
| 2009/0138942 A1 | 5/2009 | Alrabady |
| 2009/0168742 A1 | 7/2009 | Sumcad |
| 2009/0204815 A1 | 8/2009 | Dennis |
| 2009/0215466 A1 | 8/2009 | Ahl |
| 2009/0265173 A1 | 10/2009 | Madhavan |
| 2009/0265633 A1 | 10/2009 | Lim |
| 2009/0265701 A1 | 10/2009 | Naslavsky |
| 2009/0300595 A1 | 12/2009 | Moran |
| 2010/0037057 A1 | 2/2010 | Shim |
| 2010/0082559 A1 | 4/2010 | Sumcad |
| 2010/0088367 A1 | 4/2010 | Brown |

(56) References Cited

U.S. PATENT DOCUMENTS

| | | |
|---|---|---|
| 2010/0125387 A1 | 5/2010 | Sehyun |
| 2010/0161420 A1 | 6/2010 | Mandel |
| 2010/0222939 A1 | 9/2010 | Namburu |
| 2010/0235045 A1 | 9/2010 | Craig |
| 2011/0038807 A1 | 2/2011 | Papolos |
| 2011/0093846 A1 | 4/2011 | Moinzadeh |
| 2013/0179275 A1 | 7/2013 | Harb |

FOREIGN PATENT DOCUMENTS

| | | |
|---|---|---|
| DE | 10 2005 044943 A1 | 3/2006 |
| EP | 0 978 433 A2 | 2/2000 |
| EP | 1 125 784 A2 | 8/2001 |
| EP | 1 205 883 A1 | 6/2008 |
| EP | 2 012 090 A2 | 1/2009 |
| JP | 10163988 A | 6/1998 |
| JP | 2002058013 A | 2/2002 |
| JP | 2003085388 A | 3/2003 |
| JP | 2005044391 A | 2/2005 |
| JP | 2005244878 A | 9/2005 |
| JP | 2005311810 A | 11/2005 |
| JP | 2005331682 A | 12/2005 |
| WO | WO 02/19116 A2 | 3/2002 |
| WO | 03034235 | 4/2003 |
| WO | WO 2005/105509 A1 | 11/2005 |
| WO | WO 2006/023713 A2 | 3/2006 |
| WO | WO 2007/057895 A2 | 5/2007 |
| WO | 2007/092463 A3 | 8/2007 |
| WO | 2007092463 | 8/2007 |
| WO | WO 2008/050136 A1 | 5/2008 |
| WO | WO 2008/055117 A2 | 5/2008 |
| WO | WO 2008/0124795 A2 | 10/2008 |
| WO | WO 2009/016917 A1 | 2/2009 |
| WO | 2011046823 A2 | 4/2011 |
| WO | 2011047037 A1 | 4/2011 |
| WO | 2011047045 A1 | 4/2011 |
| WO | 2011047052 A1 | 4/2011 |
| WO | 2011047056 A1 | 4/2011 |
| WO | WO 2013/039760 A1 | 3/2013 |
| WO | WO 2013/039763 A1 | 3/2013 |

OTHER PUBLICATIONS

Stolowitz Ford Cowger LLP—List of Related Cases; Dec. 23, 2011; 1 page.
"Hybrid Vehicular Display" UTC; Aug. 24, 2004; United States.
"Mobile Device used as an External Graphical User Interface for Telematics Hardware installed in a Car. Demonstrating Speeding control and Road User Charge;" Disclosed by IBM; UTC; Oct. 13, 2005.
"Vehicle Console Personalization" Aug. 10, 2006; UTC; United States.
Nilsson et al.; "Secure Firmware Updates Over the Air in Intelligent Vehicles," May 19-23, 2008.
Ryu et al,: "The Design of Remote Vehicle Management System Based on OMA DM Protocol and AUTOSAR S/W Architecture;" Jul. 23-25, 2008.
Anonymous: "NAVTEQ, Nokia and Magneti Marelli Integrate Smartphone Into Car Entertainment System," Internet citation, Sep. 17, 2009, pp. 1-3. Retrieved from the Internet: URL: http://www.gadgetpaper.com/navteq-nokia-and-magneti-marelli-integrate-smartphone-into-care-entertainment-system/ [retrieved on Jan. 28, 2011] p. 2, paragraph 1-3.
Stolowitz Ford Cowger LLP—List of Related Cases; Apr. 5, 2011.
Global Patent Solutions LLC, "Additional Search Results" dated Feb. 10, 2011.
International Search Report dated Feb. 10, 2011 for PCT/US2010/052502.
Global Patent Solutions LLC, "Search Report" for Search Name: Centralized Management of Motor Vehicle Software Applications and Services, Jul. 30, 2010.
International Search Report dated Dec. 15, 2010 for PCT/US10/52515.
International Search Report dated Dec. 20, 2010 for PCT/US2010/052511.
Global Patent Solutions LLC, "Additional Search Results" for Search Name: Centralized Management of Motor Vehicle Software Applications and Services, Dec. 27, 2010.
Global Patent Solutions LLC, "Additional Search Results" dated Feb. 5, 2011.
International Search Report dated Feb. 10, 2011 for PCT/US2010/052493.
United States Patent and Trademark Office ISA; PCT International Search Report; Jun. 30, 2008; 2 pages.
Supplementary European Search Report based on EP 06 71 9988 completed on Jun. 13, 2008.
"3rd Generation Partnership Project; Technical Specification Group Services and System Aspects Push Architecture (Release 6); 3GPP TR 23.976," ETSI Standards; v. 3-SA2, No. V6 1.0; pp. 1-34; Jun. 1, 2004.
Supplementary European Search Report based on EP 08 73 1753 dated Sep. 19, 2012; 7 pages.
Fuchs et al. "End to End Content Delivery Using UPnP and WiFi Network." In: Connected Services in Mobile Networks—San Diego, CA, USA. Jan. 10-12, 2004. Retrieved on Jan. 7, 2012 from the internet at URL: <http://citeseerx.ist.psu.edu/viewdoc/download-?doi=10.1.1.110.7788&rep=rep1&type=pdf>. Entire document.
International Search Report for PCT/US2012/053977 dated Nov. 27, 2012; 2 pages.
Extended European Search Report for European Application No. EP 10 82 4027 dated May 2, 2013; 8 pages.
Olsen, Stefanie, Will consumers warm up to CATs?, CNET News. Http://news.cnet.com/Will-consumers-warm-up-to-CATs/2100-1017_3-244055.html. Aug. 3, 2000; 6 pages.
PR Newswire: "Alchemdeia and Digimarc Form Strategic Partnership to Manage Online Content," Oct. 23, 2000, Proquest #62834302, 4 pages.
Digimarc Corporation Website: Internet Archive Wayback Machine, www.archive.org, May 2001, 3 pages.
Vranica, Suzanne "NBC's Olympic Test: Counting all the Games' Viewers," Wall Street Journal, Jul. 7, 2008; 1 page.
Beaumont, Claudine, Google G1 Phone Will Teach Users How to Play the Guitar and Make the Perfect Martini Telegraph.co.uk, Date: Oct. 24, 2008; 3 pages.
International Searching Authority USPTO; International Search Report for matter PCT/US08/82509; Jan. 8, 2009; 3 pages.

\* cited by examiner

FLOW DIAGRAM

| TIME | Playlist Web Portal System | IN Cell Phone | Satellite Radio |
|---|---|---|---|
| A | | Monitor Blue Tooth (BT) | Capture button press |
| B | | BT-receive capture signal | ⇐ Send capture start |
| | | | ⇐ Send meta data |
| C | | Receive song meta data (BT) | |
| D | | Establish voice call automatically ... | |
| E | ⇐⇒ | (queue if phone busy) | |
| F | ⇐⇒ | to portal | |
| G | ⇐⇒ | Login, PW, etc. (IBS) | |
| | Store: | | |
| H | | Send Meta Data (IBS) | |
| J | Add to playlist | (optionally send location) | |
| K | Home/office-<br>--Login<br>--acquire music | Ack, Takedown call | |
| M | -- EXECUTE PLAYLIST | | |

IN-VEHICLE MOBILE MUSIC PURCHASE

RELATED APPLICATIONS

This application is a continuation-in-part of U.S. patent application Ser. No. 12/043,933 entitled "Mobile Digital Radio Playlist System" filed on Mar. 6, 2008, which claims priority to U.S. Provisional Patent Application No. 60/894,160 filed on Mar. 9, 2007; this application also claims priority to U.S. Provisional Patent Application No. 61/109,077 entitled "Enhanced Vehicle Entertainment System" filed on Oct. 28, 2008, as well as to U.S. Provisional Patent Application No. 61/109,277 entitled "Enhanced Vehicle Entertainment System" filed on Oct. 29, 2008.

COPYRIGHT NOTICE

© 2009 AIRBIQUITY INC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to mobile music and entertainment systems, and specifically pertains to remote purchasing and uses of music or other digital media items in connection with in-vehicle entertainment and communication systems.

BACKGROUND OF THE INVENTION

Satellite radio has been deployed in some motor vehicles and terrestrial broadcast digital radio is expected to follow soon. The mobile satellite digital radio receiver typically is integrated with traditional audio components such as AM/FM analog radio, CD player, MP3, and the like in a vehicle entertainment system. In some cases, wireless telecommunications (cell phones) are being integrated with vehicle entertainment systems as well, for example for "hands-free" operation. All of this functionality packed into a single unit makes for a complex user interface. Many users have not yet even learned how to find a station among the hundreds of satellite digital radio stations already available.

Figure 1:
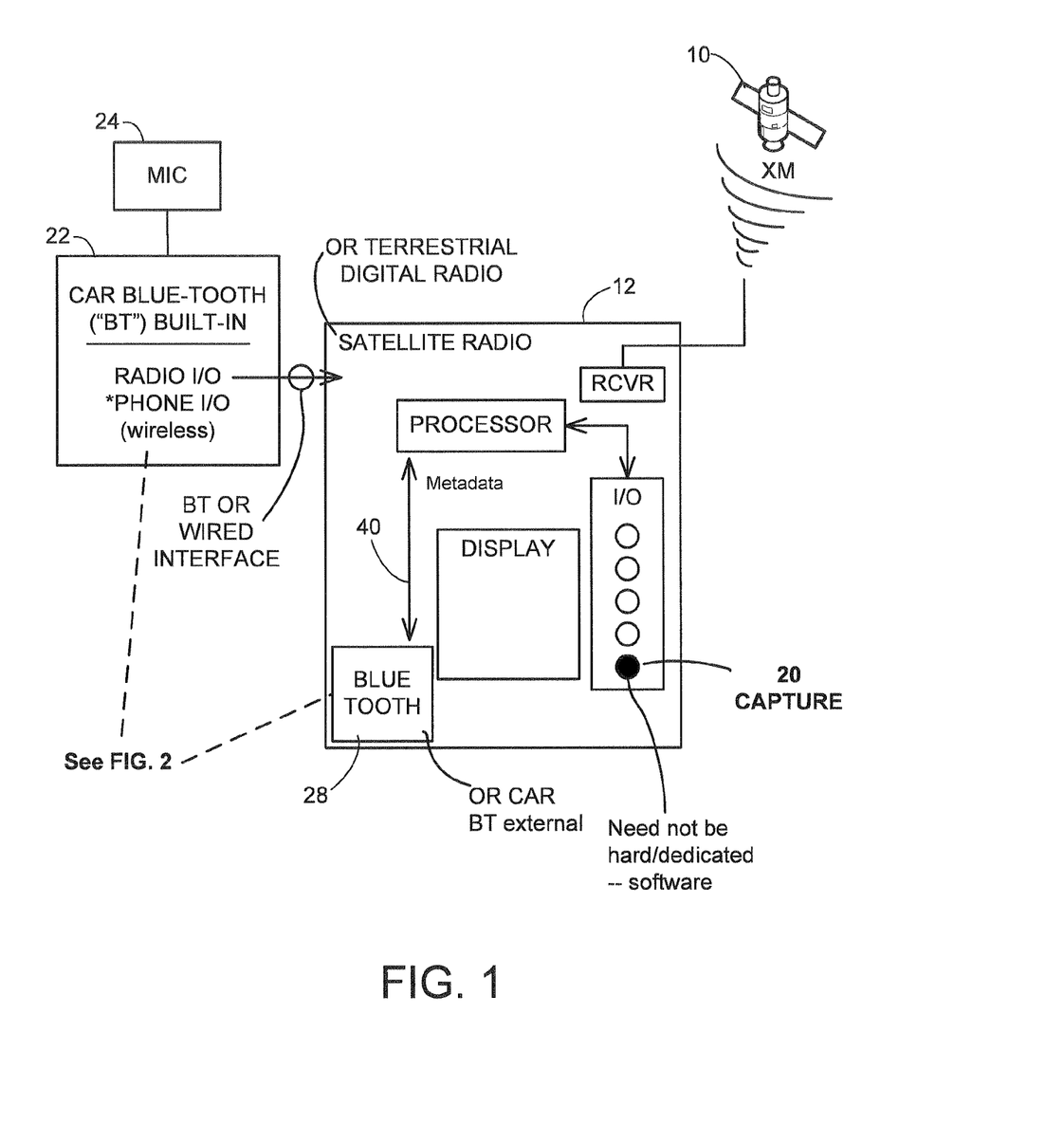
FIG. 1 is a simplified block diagram illustrating one example of a mobile digital radio system with Bluetooth and or wired interfaces.

Sometimes, when a user hears a particular song over the satellite radio, they may wish to record that song for playback later. Commercial devices are known for this purpose, such as the "XM radio recorder". The XM radio recorder, essentially a digital audio recorder, is commercially available and can be connected to a satellite radio receiver (as shown in FIG. 1) for recording a song that is received over the satellite radio. Such a unit is relatively expensive, because it is proprietary, and it cannot be used for other purposes.

The need remains for a better way to capture a song (or speech, discussion or other audio broadcast item) played over the satellite radio or other digital radio, or to at least capture metadata that describes such a song, and incorporate it into a playlist so that it can be replayed or otherwise accessed later at other locations. The driver or other occupant of a vehicle ought to be able to capture that information very easily and inexpensively. In a preferred embodiment, the user also can initiate purchase of a desired song or other digital media item automatically from a mobile location such as a motor vehicle.

SUMMARY OF THE INVENTION

The following description discloses preferred embodiments that are illustrative of improved methods and systems for managing playlists of songs including songs that are heard over a digital radio receiver, for example, in a motor vehicle, and for seamlessly purchasing songs or other audio media items heard on the mobile radio. In one embodiment, a user can purchase a desired song, heard over the vehicle radio, and have it automatically download to the user's home or office system. In another embodiment, the purchased song can be downloaded in near-real time to the vehicle in which the user is riding. At the vehicle, the song can be stored in an on-board entertainment system for future use. It may also, or in the alternative, be downloaded into the user's portable personal device, such as a PDA, iPhone, G1 phone, etc. (We will refer to all such items generically as a "mobile phone.") Preferably, the mobile phone can be linked to an on-board entertainment system, or other in-vehicle system (IVS), by a cable or a wireless connection such as a Bluetooth® transceiver. Additional aspects and advantages of this invention will be apparent from the following detailed description of preferred embodiments, which proceeds with reference to the accompanying drawings. We refer to motor vehicles or automobiles in this description to illustrate aspects of the invention, although the invention may be applied to a motorcycle, car, truck, recreational vehicle (RV), boat, plane, etc.

DETAILED DESCRIPTION OF PREFERRED EMBODIMENTS

In the following description, the selection and handling of a selected "song" and a "playlist" of songs are used as one example to illustrate principles of the invention in one application. It can also be applied to other examples of digital content, for example other audio speech, graphics or video material. For example, a certain newscast may be delivered over the radio, and the user may want to capture it for later listening at home. That media item, like a song, would fall well within the parameters of the present invention.

In accordance with the present disclosure, the "XM radio recorder" or similar device becomes unnecessary. Instead, in one embodiment of the present invention, a satellite radio user interface is modified to provide a "capture" button 20, which could be a dedicated button or software-configurable button in the user interface. When the user hears a song that he or she wants to capture, the user simply presses the button 20 on the satellite radio user interface. According to one embodiment, the music (audio content) of that song is not literally captured, but instead the name of the song and/or other metadata adequate to identify the song later, is captured, as further described herein.

Some automobiles have a built-in Bluetooth system, such as that shown in 22 "car Bluetooth built-in". For example, an automobile might have a Bluetooth system that provides a microphone 24 for connection to a cell phone for hands-free telephone calls. In one embodiment, the Bluetooth transceiver 22 may be hard-wired to the satellite radio 12. the term "hard wired" herein is not limited to a direct electrical connection. Rather, in some embodiments, a BT transceiver may be coupled to the radio via one or more in-vehicle networks or controllers. In an alternative embodiment, satellite radio 12 itself may have a Bluetooth transceiver 28 built into the radio for a similar purpose. Either the separate BT receiver 22 or the radio BT receiver 28 can be used to communicate with a user's cell phone as described herein.

Figure 2:
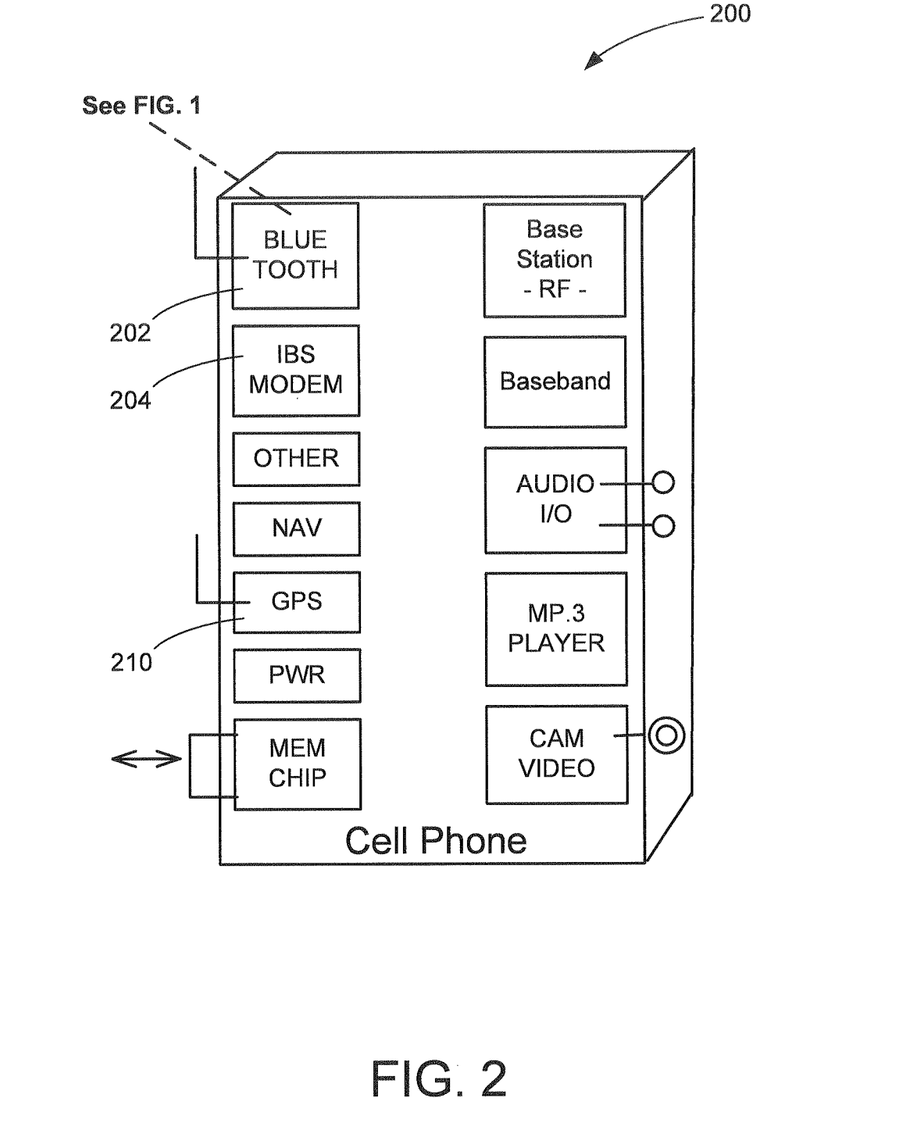
FIG. 2 is a simplified block diagram illustrating components of a cell phone.

In operation, when the user presses the capture button 20, the Bluetooth system (either the car system 22 or one integrated 28 in the satellite radio 12) initiates a message to the user's cell phone 200 in FIG. 2. The satellite radio preferably provides a transport layer software which utilizes the BT interface to deliver song information to the cell phone, and thence to the web portal or server over IBS (via IBS modem 204), SMS, or packet data transport channels. In another embodiment, the metadata is sent to a server via in-band voice channel connection. The web portal (430 in FIG. 4) and server (410 in FIG. 4) are further discussed below.

A typical cell phone 200 is illustrated in a simplified functional block diagram form in FIG. 2. This cell phone includes a Bluetooth transceiver 202. In response to a predetermined activation signal over the wireless Bluetooth channel, the cell phone (together with embedded software) will download metadata (see reference 40 in FIG. 1) describing the current song from the satellite radio 12, and then transmit that metadata to a server or web portal for later use by the user as further described below. The "current song" refers to a song currently playing, or last played, on the digital radio.

Figure 4:
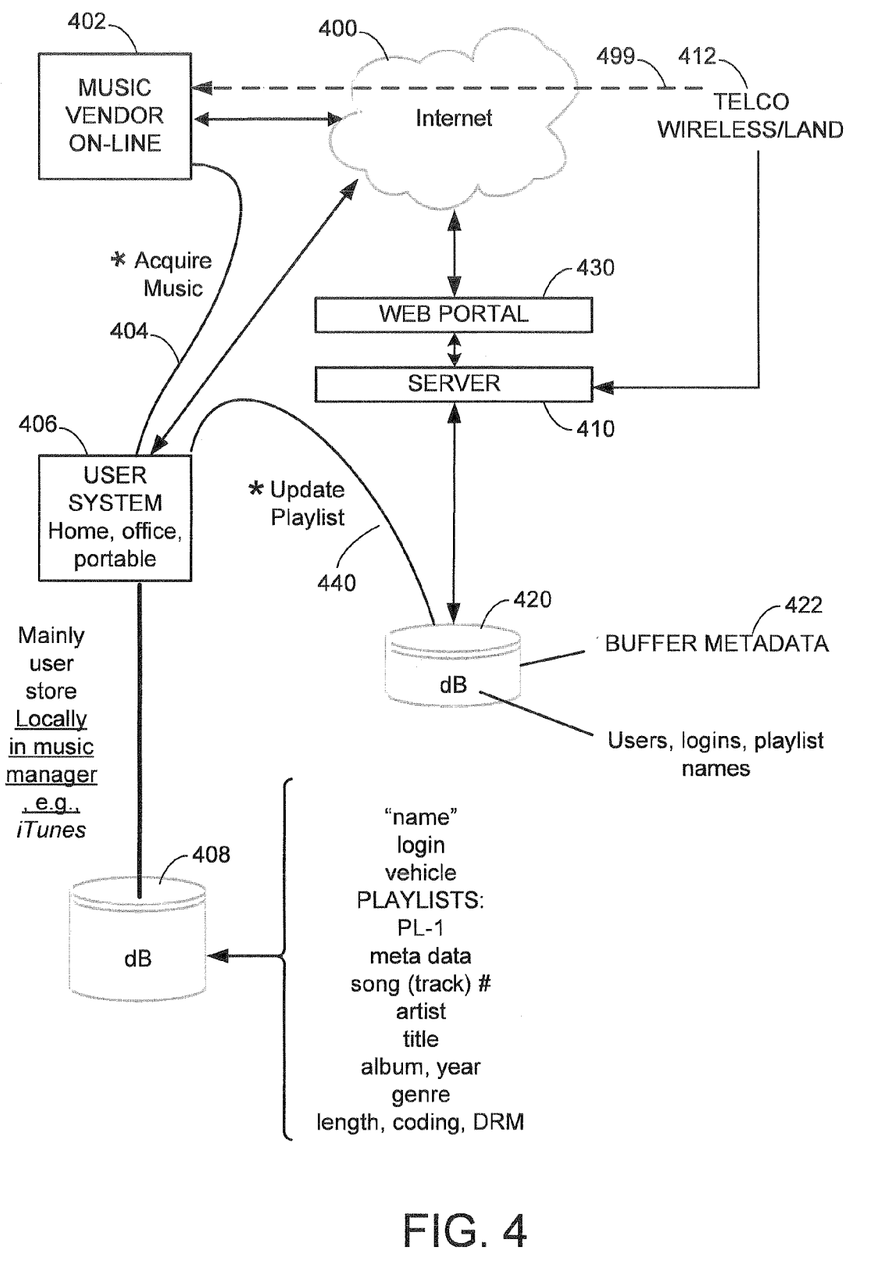
FIG. 4 presents a simplified, system level diagram of a playlist management system in accordance with one embodiment of the invention.

FIG. 4 presents a simplified, system level diagram of a playlist management system in accordance with one embodiment of the invention. In the figure, an on-line vendor of music 402 (e.g. Amazon.com, iTunes, etc.) has a web site available to the public via the Internet 400. Details of such connections, web sites, client-side web browsers, etc. are well known. Typically, a user can purchase and download desired music "on line" as indicated at reference 404. This is done using any suitable home or office computer 406, PC, laptop, PDA, etc. that has wired or wireless web access to the vendor 402. The user machine 406 has a data storage 408 (disk drive, flash drive, network storage, etc.), where it stores acquired music, other media items, and associated metadata. For example, music metadata can include for each item one or more of the song (track number), artist, title, album, year, genre, length, coding, and digital rights management (DRM) elements.

A web portal 430 consistent with the present disclosure also is accessible via the Internet 400, for example using a web page interface. The web portal 430 is coupled to a server 410 which provides the user services as described herein. The server 410 can also be coupled via suitable interface (not shown) to the telecommunications network 412, via landline (PSTN) and/or wireless connectivity to serve users via telecommunications. In particular, in a preferred embodiment, the user's cell phone 200 is used to communicate with the server 410 as further described with reference to FIG. 3 below. The cell phone acts as a conduit between the mobile digital radio 12 of FIG. 1 and the server 410. As noted, it preferably employs IBS, SMS, or packet data transport channels. However, the same principles can be adapted to follow future technical advances in wireless data communications, so the standards and protocols mentioned here should not be taken as limiting the scope of the invention.

The server 410 is coupled to a data store 420 for storing user names and accounts, logins, passwords, and actual playlists. Playlists preferably can be named by the corresponding user, and the user-selected playlist names stored in the data store as well, in association with the user. In addition, the data store 420 includes a metadata buffer 422 for storing metadata describing music or other media items. The metadata buffer need not be physically on the same data store. Music data, including metadata, can be transmitted from the buffer 422 to the user's equipment 406, for example via the server 410, web portal 430 and the Internet 400.

Figure 3:
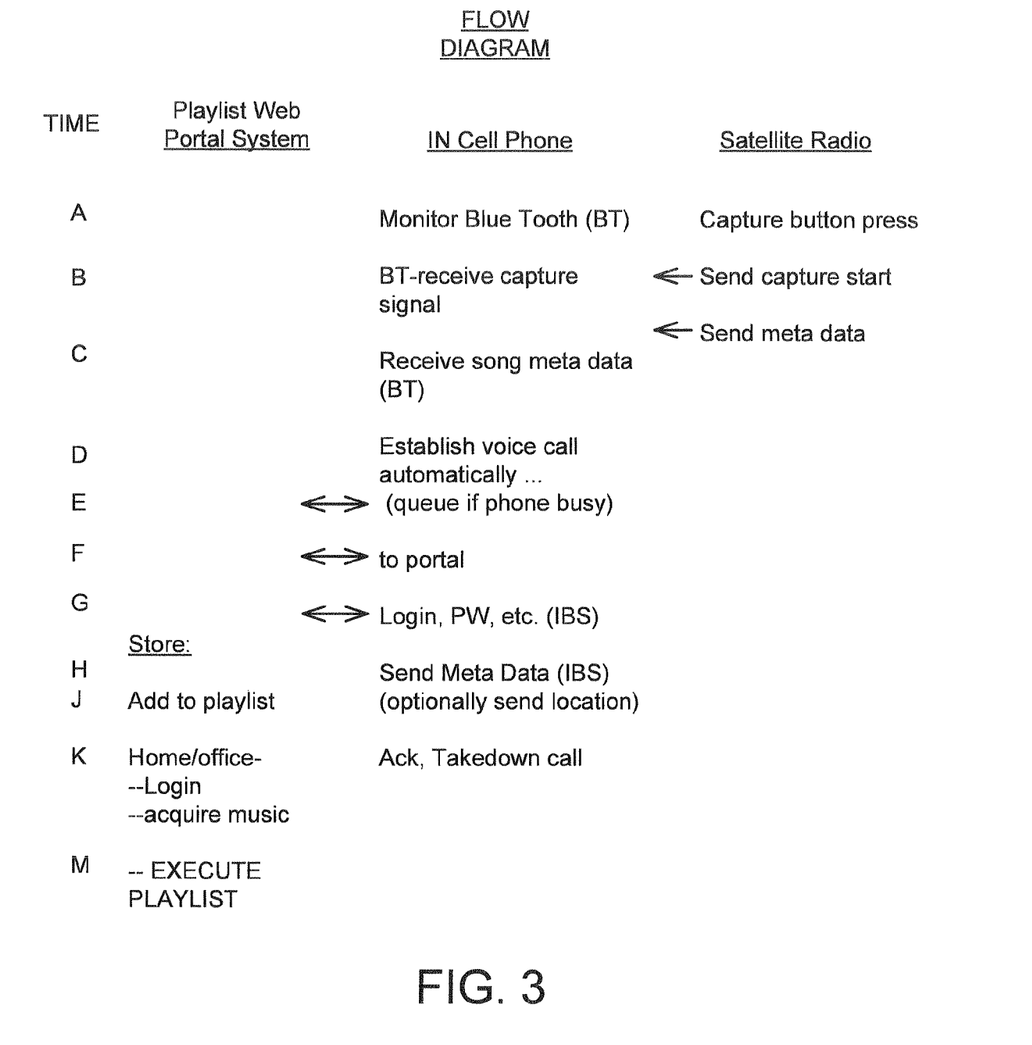
FIG. 3 is a communications flow diagram illustrating communications consistent with embodiments of the present invention among a satellite radio, a cell phone and a remote playlist portal system.

Referring to FIG. 3, it shows a flow diagram of the principal communications of one embodiment, in simplified form. As noted, beginning at time "A" the user presses the capture button on the satellite radio, and the cell phone, as it is already "on" (monitoring the BT channel), then receives a Bluetooth (BT) capture signal, time "B". (The time designations "A" through "M" in the figure are merely intended to convey a sequence of events, temporally from the top toward the bottom of the figure. The letters do not imply anything about duration of signals, delays, etc.) The satellite radio then communicates the current song metadata, time "C," over the Bluetooth channel to the cell phone. The cell phone then establishes a voice call, beginning at time "D," over the voice channel of a digital wireless telecom network, to a web portal or other predetermined destination telephone number (e.g. server 410 in FIG. 4). The call can be queued or repeated to time "E" if the line is busy.

At time "F" the call is established between the cell phone and the playlist web portal system or server. The cell phone then goes through a log-in and password procedure with the web portal, at time "G" preferably using in-band signaling ("IBS"). In-band signaling refers to sending data over the voice channel of the wireless telecom network. This has advantages over digital data channels, as explained elsewhere. After a successful log-in, the cell phone software sends the captured metadata to the web portal at time "H". Optionally, it may also send the location of the vehicle at the time the song is captured. Location data can be acquired either by using a GPS receiver (210 in FIG. 2) on board the cell phone, or by acquiring it from a vehicle navigation system through a vehicle on-board network. After acknowledgement by the server of receipt of the data, the cell phone takes down the call.

At the web portal or server, the metadata is added to the user's playlist (420) see time "J". For example, this can default to a playlist associated with the user's vehicle. When the user returns to his home or office, see time "K," or other location where he has access to the web portal system, or music management software such as i-Tunes, he can take steps to download the corresponding song based on the metadata that has now been added to his playlist. As will be explained later in more detail with respect to FIG. 5, a song can be automatically purchased and even downloaded to a preset destination selected by the user. Referring again to FIG. 4, in one embodiment, the playlist update is transmitted to the user equipment as indicated at 440 in FIG. 4. In practice, the data in one case would traverse the Internet. The user can then execute the updated playlist at any time ("M") to enjoy the song or other item first heard earlier via the satellite radio while traveling in the vehicle.

It should be noted that, in preferred embodiments, no special equipment is required in the automobile, other than a software change to the satellite radio to implement downloading metadata as described. Further, in a motor vehicle that does not have a built-in Bluetooth wireless system, that can be provided in the satellite radio. And, finally, the functionality of the cell phone of FIG. 2, as described herein, can be implemented through mere software changes to many known cell phones. Moreover, those software changes can be downloaded into the phone via a wireless call, or from another resource such as the web portal via the user equipment 406.

In another embodiment of the invention, a user (vehicle passenger) may wish to buy a song (or other media item) immediately. In this embodiment, the user may direct a purchase command directly to a music vendor, without going through a central server (illustrated via dashed line 499 in FIG. 4). In the example of purchasing digital music files, such vendors currently may include iTunes, Amazon.com, Rhapsody and others. The purchase command may be entered at the user's mobile phone user interface. The mobile phone is assumed to be connected either by cable/cradle or by a short-range wireless technology (such as that provided by Bluetooth® technology) to the vehicle systems. In another embodiment, the purchase request may be entered to a vehicle user interface, for example entertainment system interface, as further described below.

Figure 5:
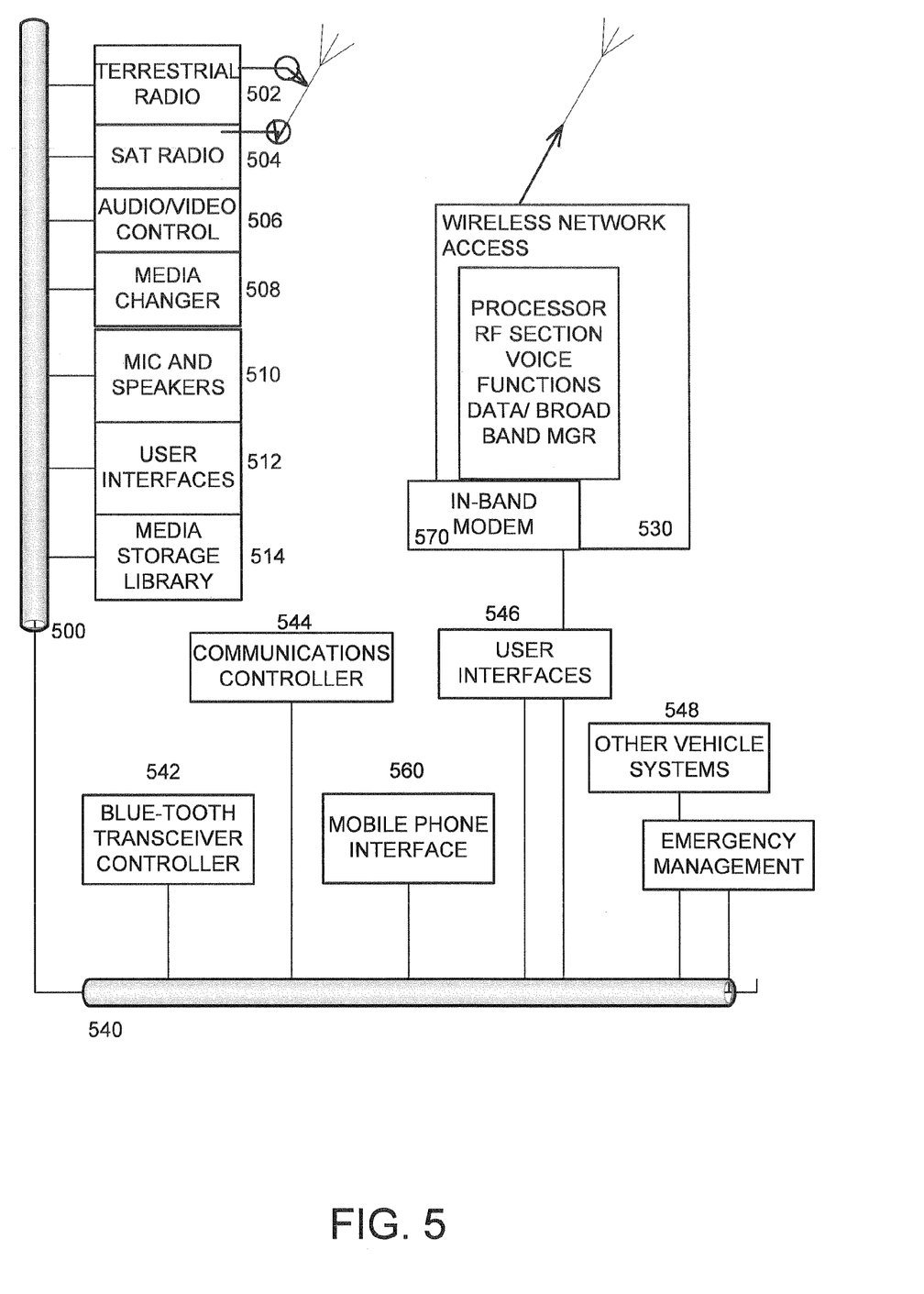
FIG. 5 is a simplified block diagram of selected aspects of in-vehicle entertainment, communications and control elements providing an operational environment for some embodiments of the present invention.

Referring now to FIG. 5, it illustrates a simplified block diagram of selected aspects of in-vehicle entertainment, communications and control elements. Here, a user's mobile phone (not shown) may be connected to the vehicle systems via a cable, cradle or the like, indicated as mobile interface 560. The mobile phone also may be coupled to the vehicle systems via a short-range wireless transceiver and controller 542. As mentioned, the user may initiate a purchase command at the mobile phone user interface (not shown), to purchase a song currently playing in the vehicle (via the digital terrestrial radio 502 or satellite radio 504). The command is detected by a communications controller 544, via the wired connection 560 or wireless connection 542.

The communications controller functionality may be implemented in a myriad of different ways. Preferably, it is implemented in software that may be executed in any of various controllers or processors available in the vehicle. In one example, a separate communication controller, indicated at 544, may be provided. In another example, the functionality (further described below) may be provided by the entertainment controller 506. In another illustrative alternative, it may be implemented in software executable in the wireless network access module (WNAM) 530, typically comprising a wireless access chip set. For illustration, we refer to the communications controller 544 as providing the required functionality.

Upon detecting the purchase command from the user (via the mobile phone interface), the communications controller 544 acquires the current song metadata from the resources described above, via the entertainment bus 500 and or the vehicle bus 540. For example, the metadata may be acquired from the satellite radio as described with reference to FIG. 1. Next, the communications controller 544 formulates a purchase request, based on or including the acquired metadata, and transmits that request to a selected music vendor to purchase the desired item. The request may be sent via the vehicle wireless network access module 530 for transmission to a particular vendor. It should be apparent that the purchasing request can be sent directly to the particular vendor without going through the server 410 described in FIG. 4.

In one embodiment, the controller 544, via the WNAM 530, accesses a selected music vendor website via the Internet, in other words a remote server corresponding to a particular vendor. Vendor selections and addresses (URL) may be stored in the controller (or in other available memory such as 506, 514). They may be updated from time to time, via a user interface (546, 512), or programmatically. The controller 544 also has payment information for the user pre-stored, for use in making the requested purchase. In one embodiment, the controller makes the purchase request using wireless data or broadband services via 530. Then, the controller manages download of the purchased item, and stores the digital files, for example music files, in a memory, such as the media storage library 514 via the entertainment bus 500.

In another embodiment, no mobile phone is required at all. The user simply enters a purchase command via a user interface on the vehicle, such as 512 (the entertainment system user interface), or another interface 546 (such as on-board computer/navigation system interface), or even a button on the dashboard or steering wheel. In one embodiment, a "BUY" button can be provided similar to the CAPTURE button (20) in FIG. 1. A voice command can be used as well, via the microphone 510 and associated audio/video controller 506. The controller 506 in that case will notify the communications controller 544 of the purchase request. As above, the controller 544 will acquire the current song metadata and make the purchase. Voice commands may include, for example, the following:

TABLE

Voice Commands

| | | |
|---|---|---|
| "call" | Place a wireless phone call | Prior art |
| "capture" | Capture metadata for the current song | See FIG. 1 |
| "buy" | Purchase the current song | See FIG. 5 |
| "repeat" | Replay the current song | Song is buffered in media storage library, subject to intellectual property rights |
| "delete" | Delete the current song from the media storage library | |

In an alternative embodiment, the purchase request may be sent to the vendor by a wireless messaging service, such as SMS, rather than by broadband or Internet connection. In that case, it will have to transmit a destination address for the download via a broadband service. Defaults or selection criteria for selecting among data services may be stored or configurable. The selection may be based on wireless services available at the time, as determined by 530 and reported to the controller 544.

In another embodiment, an in-band modem 570 may be used to send the purchase request in the voice channel of a wireless call to the vendor.

In any of these embodiments, the desired song or other purchased media item can be downloaded to the vehicle, as mentioned, or to the user's home or office, or other pre-arranged location. For example, the user may store all of her music on an Internet location/web site arranged to provide that service. If downloaded to the vehicle, as described above, the media item can later be uploaded to the user's mobile phone from the media storage library 514.

It will be obvious to those having skill in the art that many changes may be made to the details of the above-described embodiments without departing from the underlying principles of the invention disclosed herein. The scope of the present invention should, therefore, be determined only by the following claims.

The invention claimed is:

1. A vehicle system comprising:
a digital radio receiver for receiving and playing a current song in a vehicle;

a controller in the radio receiver that decodes metadata that identifies the current song;

a cell phone in the vehicle, the cell phone having instructions stored thereon that, in response to execution by a processing device of the cell phone, cause the processing device to, in response to receiving a predetermined activation signal and the decoded metadata that identifies the first song over a first transceiver of the cell phone, transmit the decoded metadata that identifies the current song to a remote location over a second transceiver of the cell phone that is different than the first transceiver of the cell phone;

a capture input button or softkey in the radio receiver to trigger transmission of the predetermined activation signal and the decoded metadata that identifies the first song to the cell phone via the first transceiver; and the controller configured to access a purchase configuration storing user preferences to generate a purchase request for the current song identified by the metadata, wherein the stored user preferences are preset prior to said triggering using the capture input button or softkey and identify a particular music vendor.

2. The vehicle system of claim 1 including:
a purchase button in the radio receiver to trigger the controller to generate and transmit the purchase request using the preset preferences stored in the purchase configuration.

3. The vehicle system of claim 2 wherein the buttons comprise a voice interface and each button corresponds to a different voice command.

4. The vehicle system of claim 1 wherein the controller is configured to identify a currently available one of a plurality of wireless connection modes and wirelessly transmit the generated purchase request using the currently available wireless connection mode, wherein the plurality of wireless connection modes includes at least a first mode of transmitting over a digital wireless call in a voice channel using in-band signaling and a second mode of transmitting that utilizes one or both of a wireless Short Message Service (SMS) and a wireless packet data service.

5. The vehicle system of claim 1 wherein the controller is configured to select from a plurality of wireless connection modes according to said preset preferences and wirelessly transmit the generated purchase request using the selected wireless connection mode, wherein the plurality of wireless connection modes includes at least a first mode of transmitting over a digital wireless call in a voice channel using in-band signaling and a second mode of transmitting that utilizes one or both of a wireless SMS service and a wireless packet data service.

6. The vehicle system according to claim 1 wherein the first transceiver comprises a short-range radio transmitter.

7. The vehicle system according to claim 1 including:
a user input to the radio receiver to initiate capture and transmission of the metadata.

8. The vehicle system according to claim 1 wherein the preset preferences include an identification of the particular music vendor and account information including a login and password for the particular vendor.

9. The vehicle system according to claim 8 wherein the preset preferences include a destination address for automatically downloading a purchased file in response to downloading the transmitted purchase request.

10. The vehicle system according to claim 9 wherein the preset preferences include a particular wireless service for transmitting the purchase request.

11. The vehicle system of claim 1, wherein the controller is configured to:
automatically establish a voice call to a predetermined telephone number responsive to the triggering using the capture input button or softkey if a line corresponding to the cell phone is available;
modulate the decoded metadata for in-band transmission over a wireless telecom voice channel of the established voice call and forwarding said modulated representation of the decoded metadata in-band over the wireless telecom voice channel of the established voice call; and
if the line is busy, queue the decoded metadata for a later transfer.

12. A method comprising:
capturing metadata that identifies a current media playing in a motor vehicle;
in response to a manual capture input signal, transmitting the captured metadata from a digital radio receiver of the motor vehicle to a personal portable device in the vehicle, wherein the captured metadata is received by the personal portable device over a first transceiver of the personal portable device;
in the personal portable device, accessing a purchase configuration that stores user preferences for purchasing media, wherein the stored user preferences are preset prior to said capturing of the metadata and identify a particular media vendor; and
in the personal portable device, generating a purchase request based on said preset preferences and the captured metadata and wirelessly transmitting the generated purchase request to a remote location over a second transceiver (of the personal portable device) that is different than the first transceiver, wherein the purchasing request is configured to automatically purchase the current media identified by the metadata from the particular vendor identified by the present preferences.

13. The method according to claim 12, wherein the generated purchasing request is addressed to a server or other machine operated by the particular vendor, and wherein the generated purchasing request includes account information from the purchase configuration that corresponds to the particular vendor including a login and password for the particular vendor.

14. The method according to claim 12 wherein the generated purchasing request is addressed to a playlist server to cause the playlist server to access login and password information for a server or other machine operated by the particular vendor and communicate with the server or other machine using the accessed login and password information.

15. The method according to claim 12 wherein said wirelessly transmitting the generated purchase request to the remote location includes transmitting the generated purchase request over a wireless Short Message Service (SMS), a digital wireless call in a voice channel using in-band signaling, or a wireless packet data service.

16. The method according to claim 12 wherein the purchase configuration data identifies a ranking of vendors and the method further includes selecting the particular vendor using the ranking, and if the current media identified by the metadata is unavailable for purchase with the selected particular vendor, selecting a next highest ranked vendor using the ranking.

17. The method according to claim 12 wherein the generated purchasing request includes a destination address extracted from the preset preferences, and wherein the destination address corresponds to a computing device located remotely from the personal portable device.

18. The method according to claim 17 and further comprising automatically downloading the purchased media to the computing device.

19. The method according to claim 12 and further comprising:
sending data indicative of a current location of the mobile digital radio receiver of the motor vehicle to a remote server in association with the captured metadata that identifies the current media; and
acquiring said location data from a GPS receiver.

20. The method according to claim 19 and further including acquiring said location data in response to said manual capture input signal.

21. The method according to claim 12 and further comprising selecting from a plurality of wireless connection modes according to said preset preferences and performing the wireless transmission of the purchasing request using the selected wireless connection mode, wherein the plurality of wireless connection modes include at least a first mode of transmitting over a digital wireless call in a voice channel using in-band signaling and a second mode of transmitting that utilizes one or both of a wireless SMS service and a wireless packet data service.

22. The method according to claim 12, further comprising:
automatically establishing a voice call to a predetermined telephone number responsive to the triggering using the capture input button or softkey if a line corresponding to the personal portable device is available;
modulating the decoded metadata for in-band transmission over a wireless telecom voice channel of the established voice call and forwarding said modulated representation of the decoded metadata in-band over the wireless telecom voice channel of the established voice call; and
if the line is busy, queuing the decoded metadata for a later transfer.

* * * * *